Nov. 15, 1966 K. EICKMANN 3,285,190
PISTON MEANS FOR DAMPING NOISE AND/OR VIBRATIONS
IN ROTARY FLUID MACHINES
Filed Aug. 14, 1963 9 Sheets-Sheet 1

INVENTOR.
KARL EICKMANN

INVENTOR.
KARL EICKMANN

Nov. 15, 1966  K. EICKMANN  3,285,190
PISTON MEANS FOR DAMPING NOISE AND/OR VIBRATIONS
IN ROTARY FLUID MACHINES
Filed Aug. 14, 1963  9 Sheets-Sheet 3

INVENTOR.
KARL EICKMANN
BY McGrew and Toren
Attorneys

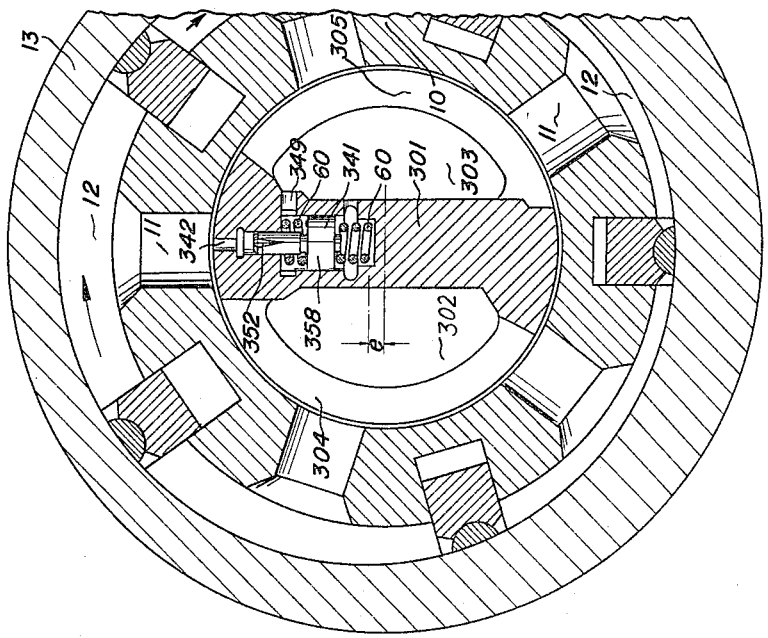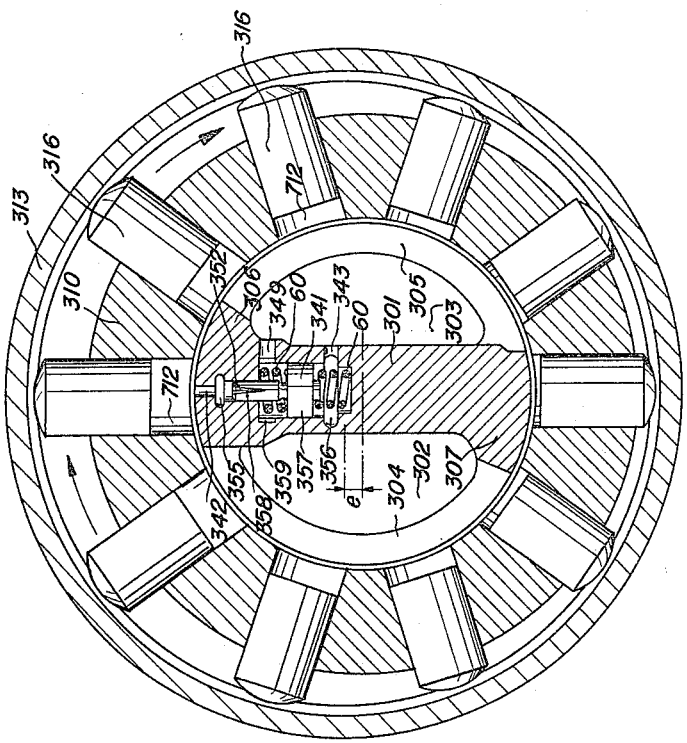

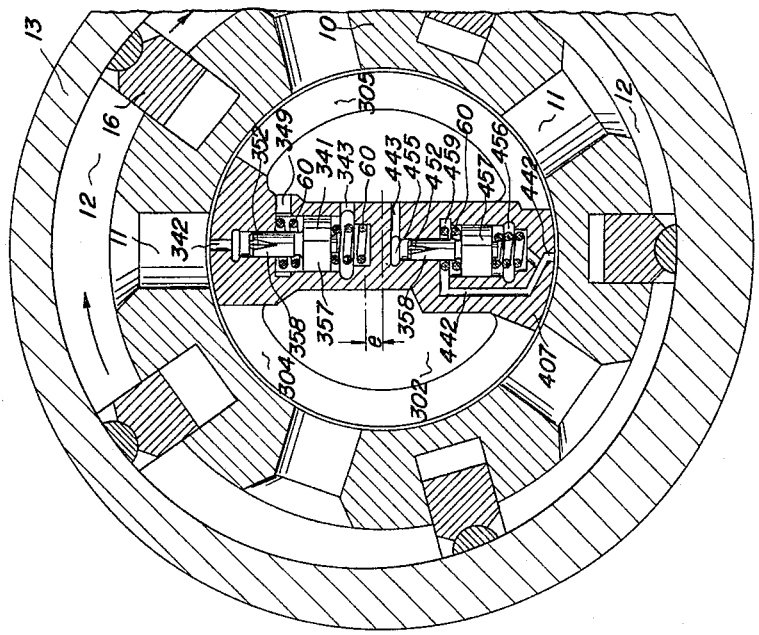
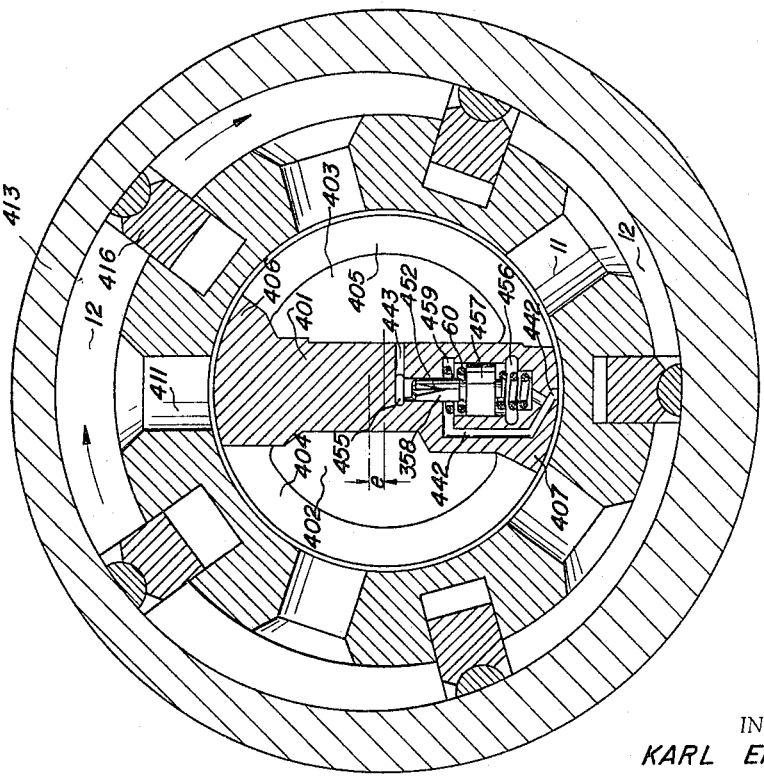

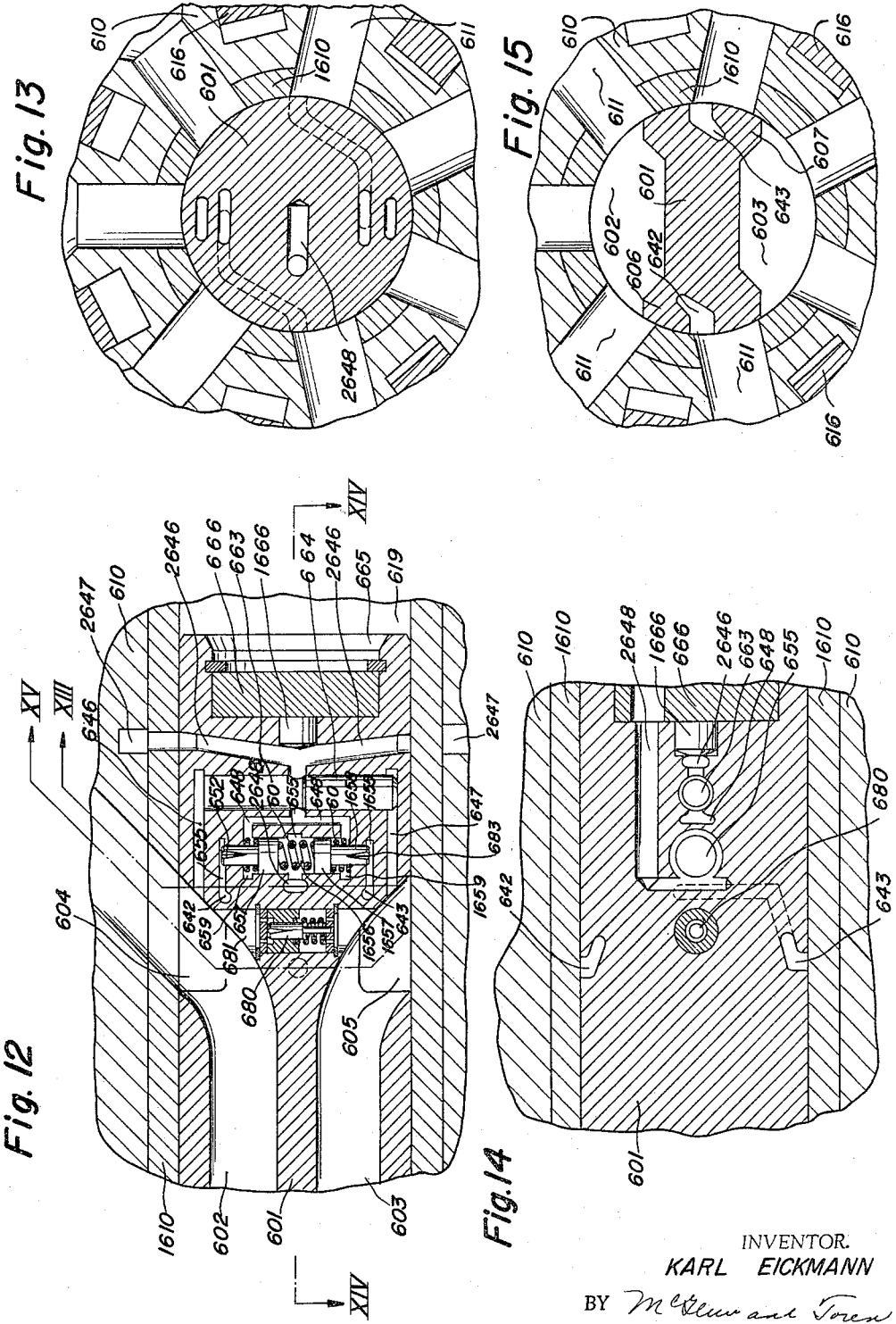

Nov. 15, 1966      K. EICKMANN      3,285,190
PISTON MEANS FOR DAMPING NOISE AND/OR VIBRATIONS
IN ROTARY FLUID MACHINES
Filed Aug. 14, 1963      9 Sheets-Sheet 7

INVENTOR.
KARL EICKMANN
BY McGhee and Toren
Attorneys

Nov. 15, 1966  K. EICKMANN  3,285,190
PISTON MEANS FOR DAMPING NOISE AND/OR VIBRATIONS
IN ROTARY FLUID MACHINES
Filed Aug. 14, 1963  9 Sheets-Sheet 8
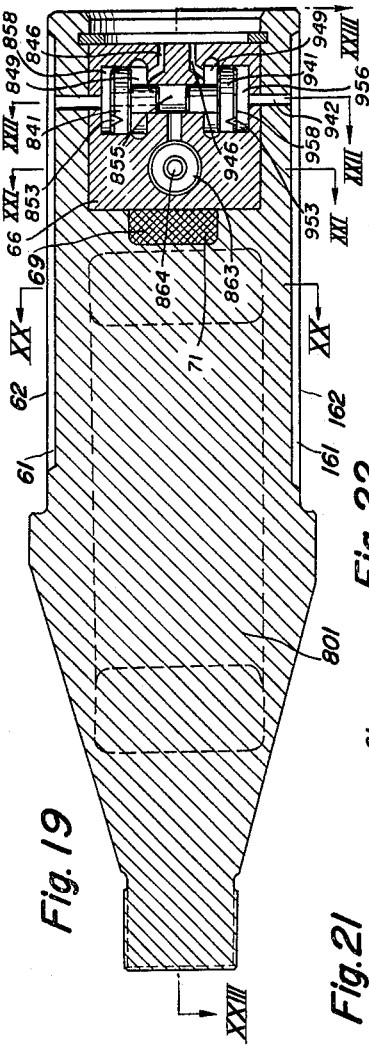
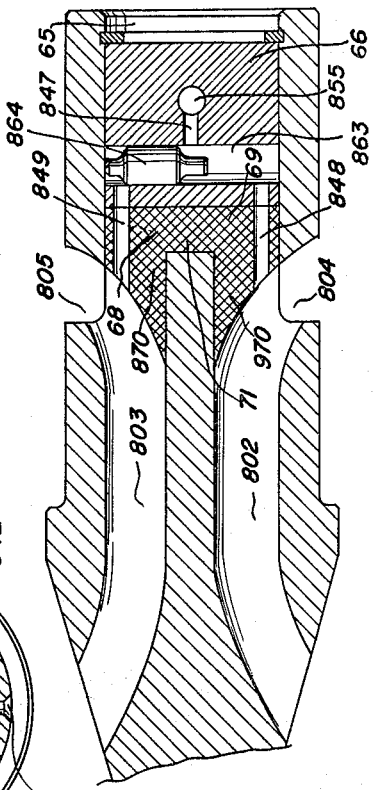
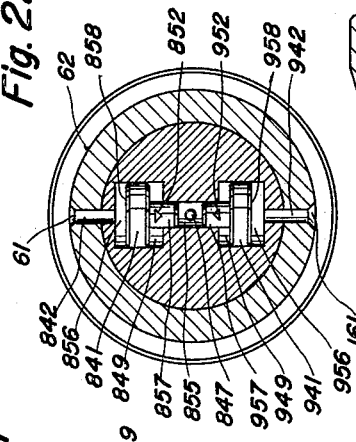
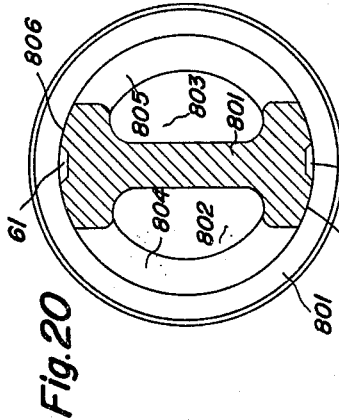
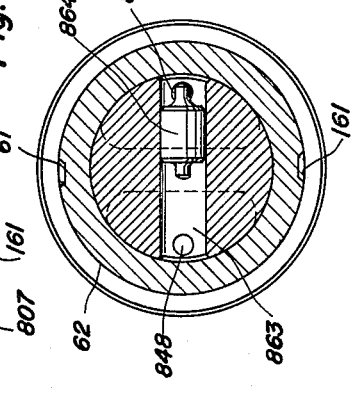
INVENTOR.
KARL EICKMANN
BY McGlew and Toren
Attorneys Nov. 15, 1966  K. EICKMANN  3,285,190
PISTON MEANS FOR DAMPING NOISE AND/OR VIBRATIONS
IN ROTARY FLUID MACHINES
Filed Aug. 14, 1963  9 Sheets-Sheet 9
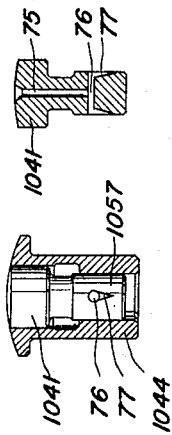
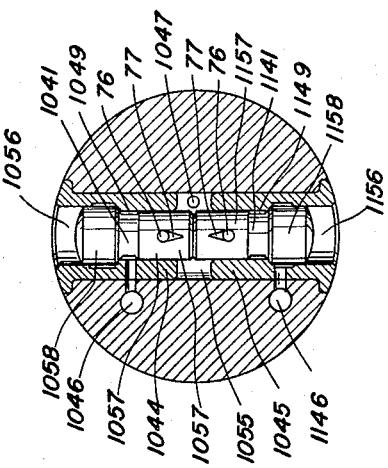
INVENTOR.
*KARL EICKMANN*

United States Patent Office 3,285,190
Patented Nov. 15, 1966

3,285,190
PISTON MEANS FOR DAMPING NOISE AND/OR VIBRATIONS IN ROTARY FLUID MACHINES
Karl Eickmann, 2420 Isshiki Hayama-machi, Kanagawa-ken, Japan
Filed Aug. 14, 1963, Ser. No. 302,121
22 Claims. (Cl. 103—136)

This invention relates to fluid operated or fluid operating rotary machines wherein working chambers increase and decrease their volume and thereby intake and expel fluid periodically during operation of the machine.

More in detail this invention relates to such rotary machines wherein the flow of fluid into and out of the rotor of the machine is controlled by a non-rotary control means which is provided with entrance and exit control ports and with control faces on the nonrotary control means and on the rotor and wherein said control faces are adapted against each other and slide relatively to each other.

Still more in detail this invention relates to means for damping the "disturbing load" or for damping noises or vibrations in rotary machines.

In such rotary machines the "disturbing load" appears and as result of the said "disturbing load" noises and/or vibrations appear during operation of the machine. It is the intention of this invention to narrow the said disturbing load and thereby to narrow or eliminate the noise and/or the vibrations in rotary fluid operated or fluid operating machines.

It is therefore the primary object of this invention to provide noise damping piston means for the elimination or softening of the disturbing load in the fluid machine, which also reduce noise and/or vibrations in rotary fluid operated or fluid operating machines;

Another object of this invention is to provide a rotor bearing and/or simple control body for the passing and control of flow of fluid or flows of fluid into and out of the working chamber or chambers of the fluid machine whereby said control body might be able to bear the rotor of the fluid machine;

It is an additional object of this invention to provide noise damping pistons, noise damping cylinders and/or bores or recesses or passages or passage means thereon;

Another object of the invention is to provide differential pistons for the narrowing or elimination of the disturbing load, noise or vibrations;

Another additional object of the invention is to provide passage and/or control recesses on or in the pistons or in or on the differential pistons;

Still a further object of the invention is to provide the combined operation of noise damping pistons with control pistons;

Another additional object of the invention is to provide passages and/or control means in or on pistons or differential pistons which are timewise or strokewise opened or closed;

Another additional object of the invention is to provide intercylinder chambers which may be loaded by fluid under high or under low pressure or which may be opened to the outside;

Another additional object of the invention is to provide outermost cylinder spaces or widened cylinder spaces whereinto fluid is passed out of the respective closed working chamber, interslot space or inter-cylinder space via communication means through the control body;

Still a further additional object of the invention is to provide a longitudinal bearing groove or a longitudinal recess or another control means through the closing arc or arcs of a control body and/or thereby to connect the outermost cylinder spaces timewise or periodically with respective closed working chambers;

A still further additional object of the invention is to provide an innermost or narrowed cylinder space or cylinder spaces and to provide a communication or flow of fluid under high pressure thereinto and/or to govern the said flow or communication thereinto by a control piston;

A still further additional object of the invention is to bear a simplified control body in the heck cover or in a stationary casing part of the rotary machine and to provide a longitudinal extending and/or bearing groove or a plurality of such grooves in said control body;

Another additional object is to extend fluid passages in at least on axial direction through a control body;

Still another additional object is to provide a closure member bed and a closure member or an inserted member and/or a plastical seal block and/or plastical seal blocks in or for sealing a passage or passages of said control body;

And it is an additional object of the invention to provide cylinders, differential cylinders, pistons and/or differential pistons or fluid passages in said closure member or in said inserted member.

More details, objects, means or features of the invention will become apparent from the detailed description of the accompanying drawings wherein:

FIGURE 8 is a cross sectional view through a rotor and a control body of a rotary fluid machine of the radial piston type wherein embodiments of the piston means of this invention are assembled in the control body.

FIGURE 9 is a cross sectional view through a rotor and a control body of another rotary fluid machine wherein embodiments of the piston means of this invention are assembled in the control body.

FIGURE 10 is a cross sectional view through a rotor and a control body of another rotary fluid machine wherein embodiments of the piston means of this invention are assembled in the control body.

FIGURE 11 is a cross sectional view through a rotor and a control body of another rotary fluid machine wherein embodiments of the piston means of this invention are assembled in the control body.

FIGURE 12 is a longitudinal sectional view through a control body and through a part of a rotor of a rotary fluid machine wherein embodiments or piston means of this invention are assembled in the control body.

FIGURE 13 is a cross sectional view through FIG. 12 taken along the line XIII—XIII.

FIGURE 14 is a longitudinal sectional view through FIG. 12 taken along the line XIV—XIV.

FIGURE 15 is a cross sectional view through FIG. 12 taken along the line XV—XV.

FIGURE 16 is a longitudinal sectional view through another embodiment of a rotary fluid machine demonstrating a control disc and a part of the rotor of the machine and demonstrating piston means of this invention in the casing and/or control body means of the machine.

FIGURE 17 is a cross sectional view through FIGS. 16 taken along the line XVII—XVII.

FIGURE 18 is a cross sectional view through FIG. 16 taken along the line XVIII—XVIII.

FIGURE 19 is a longitudinal sectional view through an embodiment of a control body of the invention wherein piston means of this invention are located.

FIGURE 20 is a cross sectional view through FIG. 19 taken along the line XX—XX.

FIGURE 21 is a cross sectional view through FIG. 19 taken along the line XXI—XXI.

FIGURE 22 is a cross sectional view through FIG. 19 taken along the line XXII—XXII.

FIGURE 23 is a longitudinal sectional view through FIG. 19 taken along the line XXIII—XXIII.

FIGURE 24 is a cross sectional view through an inserted member or a control body part wherein other embodiments of piston means of this invention are assembled.

FIGURE 25 is a longitudinal sectional view through a cylinder means of this invention wherein an embodiment of piston means of this invention is assembled.

FIGURE 26 is a longitudinal sectional view through the piston means of FIG. 25.

Figure 2:
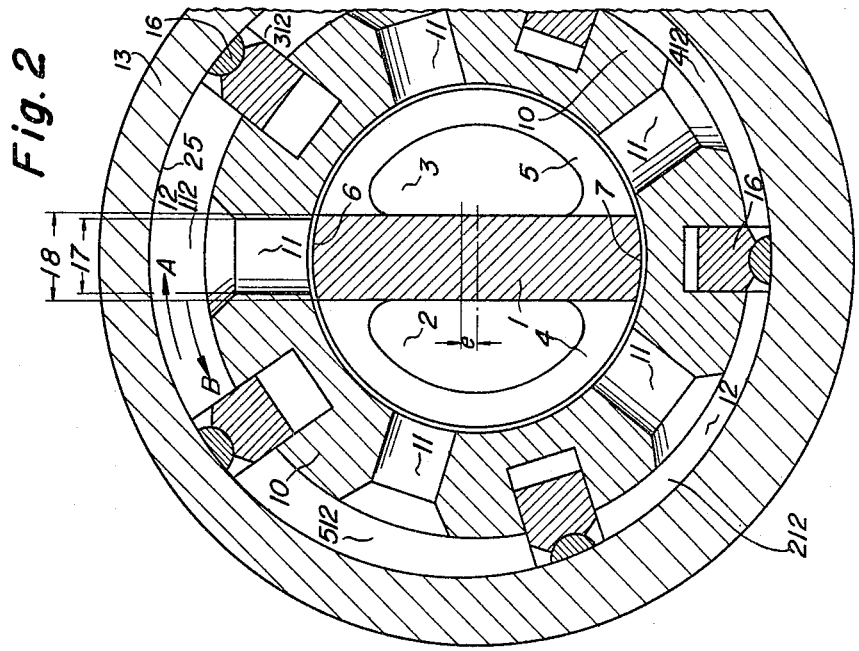
FIGURE 2 is a cross sectional view through FIG. 1 take along the line II—II.
Figure 1:
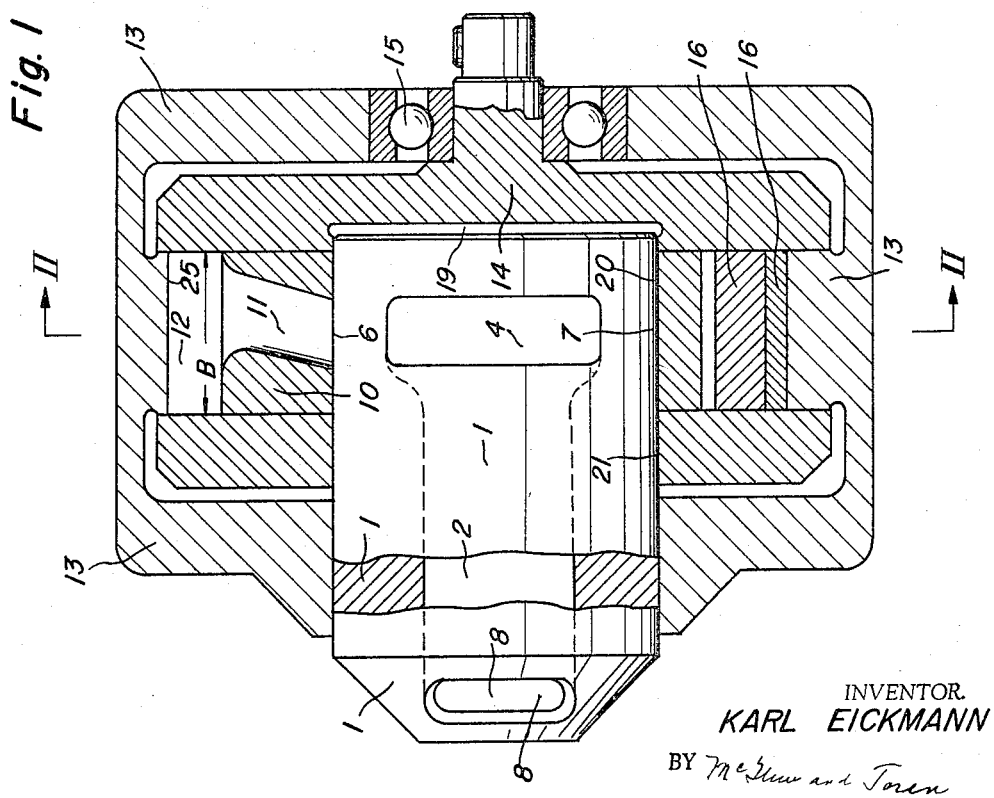
FIGURE 1 is a longitudinal sectional view through an embodiment of a conventional rotary machine.

In the conventional rotary fluid machine of FIGS. 1 and 2 a rotor 10 is connected to shaft 14 and borne in bearing 15 and/or on a stationary body 1. Rotor 10 is able to revolve around its axis. All rotary parts are assembled in the casing 13. The stationary control body 1 is borne or fastened in casing 13 or a cover thereof. Control body 1 is provided with entrance and exit ports 8 or 9. Each of the entrance or exit ports may act interchangeably as an exit or entrance port depending on the situation or practical application. Control body passages 2 and 3 extend through the control body 1 and they are separated from each other. Control body 1 is also provided with control ports 4 and 5.

Control body passage 2 extends from entrance or exit port 8 through control body 1 into control port 4. Control body passage 3 extends from entrance or exit port 9 through control body 1 into control port 5. Fluid, like liquid or gas, can pass through the said entrance or exit ports, control body passages or fluid passages and through the said control ports.

The rotor 10 is provided with spaces 12 acting as rotor passages 11 and with working chambers or working spaces such as cylinder spaces, intervane spaces, trochoid spaces, interslot spaces, or the like. In the example of a conventional fluid machine of FIGS. 1 and 2 there are intervane spaces 12 acting as working chambers 12 and the intervane spaces 12 are separated from each other by vane assemblies 16 which are located in respective slots of rotor 10.

The said rotor passages 11 extend from the respective working chamber or interslot spaces 12 to the rotary control surface 20 of rotor 10. The said rotary control surface 20 is in this case a cylindrical surface, formed in the rotor hub or rotor center bore 19. The said rotary control face 20 cooperates with the stationary control face 21 of control body 1. Both control faces fit against each other and are sliding relatively to each other if rotor 10 revolves. A small clearancve is provided between the said control faces in order to make relative movement between them possible.

The said control faces are cylindrical faces in the example of FIGS. 1 and 2. But it should be understood that the said control faces are in other examples of rotary fluid machines may be of conical, plane or spherical configuration depending on the actual design.

In the fluid machine of FIGS. 1 and 2 the axis of the working chamber of the casing 13 is distanced by the eccentricity "$e$" from the axis of the rotor 10 and therefrom follows that the intervane spaces or working chambers 12 increase and decrease their volume during each revolution of rotor 10.

Thus, if rotor 10 revolves clockwise (arrow A), fluid, like liquid or gas, flows from entrance port 8 through fluid passage 2 into control port 4 and out from control port 4 through the respective rotor passages 11 into the respective volume increasing, intervane spaces or working chambers 12 and out from the respective volume decreasing working chambers or intervane spaces 12 through the respective rotor passages 11 into control port 5 and therefrom through fluid passage 3 and through exit port 9 out of the machine.

The fluid machine of FIGS. 1 and 2 is of fixed displacement but is should be understood that such rotary fluid machines can also be of variable displacement and/or reversible. In such case the eccentricity "$e$" is variable, as known in the art. The said fluid machines can act as hydraulic pumps if they are producing a flow of liquid, they can act as hydraulic motors if they are driven by a flow of liquid, they can act as compressors if they are producing a flow of air, gas or steam and they can act as pneumatic motors or also as combustion engines if they are driven by a flow of air, gas or steam under pressure or if such flow of air or gas receives increased pressure inside of the machine. The rotors of fluid machines can rotate clockwise (arrow A) or anti-clockwise (arrow B).

The expression "fluid" which is used in this specification shall mean, that fluid has the ability to flow and that fluid might consist of liquid or of gas. The expression rotary fluid machine shall mean that a rotor can revolve in said machine, that working chambers like intervane spaces, interslot spaces, trochoid spaces, inter gear spaces, gear spaces or inter-trochoid spaces or the like are periodically increasing and decreasing their volume during revolution of the rotor thereby intaking or expelling fluid so that fluid flows through the machine, regardless if the flow of fluid is produced in the machine or if the flow of fluid is supplied under pressure or no pressure to the machine.

This invention deals only with such rotary fluid machines wherein the flow of fluid through the machine is controlled by control ports, but not by valves.

Control ports for rotary fluid machines are characterized therein, that the fluid flows from fluid passage 2 through a respective entrance control port 4 through the respective rotor passage or passages into the respective working chamber or chambers during the increase of the volume of the working chamber or chambers; that thereafter, substantially when the working chamber moves through its outer dead point, the respective rotor passage 11 is closed by a respective closing arc or closing face 6 of the control body 1; that thereafter the fluid flows out of the volume decreasing working chamber or chambers through a respective rotor passage or passages 11 into the respective control port 5 and the respective fluid passage 3 and that the respective rotor passage 11 is closed during the travel of the respective working chamber 12, substantially with its smallest volume, over the inner dead point by a respective closing arc or closing face 7 of control body 1.

In rotary fluid machines it is important that the peripherial length or the length of the closing arc or face and the peripherial length of rotor passages 17 are accurately designed and machined and it is also important that the length of the control bodies closing arc or face or arcs or faces 18 is or are accurately designed and machined. The difference between the length of the arcs of the rotor passages 17 and the control body closing faces 18 has a large influence on the accurate operation of the machine and of the accurate control of the flow of fluid therethrough. If the arc or length 17 of the respective rotor passage is greater than the arc or length of the control body closing arc or face 18, then leakage appears out from the high pressure control port through the open part between the rotor passage 11 and the control body closing arc or face 18 into the low pressure control port. This reduces the efficiency of the machine, but on the other hand as it was already discovered in the past, reduces or eliminates the noise or vibrations in the machine.

If on the contrary, the peripherial length or the length of the arc 17 of the respective rotor passage is shorter than the length of the control body closing face or than the length of the closing arc 18 of the control body, then the said leakage is prevented but then increased noise and/or vibration appears in the respective fluid machine.

It was therefore customary in the past to make the closing arc or the closing face 18 of the control body 1 only slightly longer than the length of the arc 17 or the length of the rotor passage in a peripheral direction.

Since that alone did not in any case satisfy the desired smooth operation of the machine it has been tried in the past to lengthen the respective closing arc or control body closing face 18 and to provide recesses, bores, notches, triangular grooves or the like therethrough or thereon and it has also been tried to supply small overload valves to the control body or rotor or casing of the machine. Another expedient tried in the past has been to provide piston means operating in respective cylinders for communication with fluid ports and for oscillation responsive to fluctuations in the operative compression or expansion of the working fluid or the machine. These attempts have more or less succeeded to eliminate a part of the noise or vibrations, but such success which was only limited, resulted on the other hand in the reducing of the total and volumetrical efficiency of the machine by reason of the appearance of a certain leakage through such means from spaces under high pressure into spaces under less pressure.

In order to overcome these disadvantages, this invention is based on research on the details of the control of the flow of fluid through the machine by control ports and closing arcs or faces and on the discovery of accurate equations for the calculation of the "disturbing load" which is the reason for the appearance of noise or vibrations in such fluid machines.

Based on the accurate calculation of the disturbing load, which is discovered by this invention, the piston means of this invention can be so calculated, dimensioned and located that they succeed in reducing, substantially more than in earlier disclosures, the disturbing load and thereby to reduce or eliminate the noise or vibrations in rotary fluid machines in an effective and simple matter, whereby also to reduce leakage losses and to prevent decrease of the total or volumetric efficiency of the machine, by the supply of noise damping means.

Figure 3:
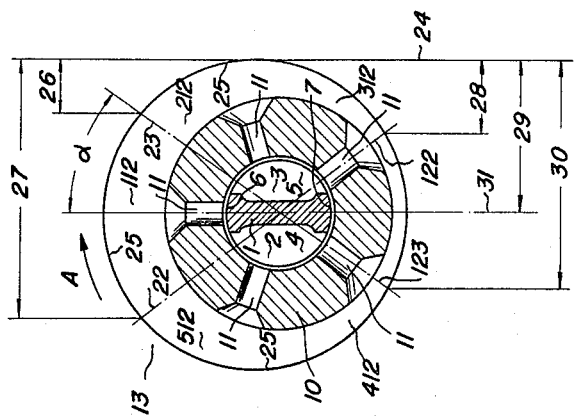
FIGURE 3 is a simplified modification of FIG. 2.

In FIG. 3 the rotary machine of FIG. 2 is demonstrated in a simplified way. The line 22 represents a bordering plane or face 22 which is located through the rotor axis or through the control body axis and extends therefrom to the extreme left end of the upwards located intervane space or working chamber 112. The bordering plane or face 23 goes through the rotor center line or the center line of control body 1 and extends therefrom to the extreme right end of the respective upwards working chamber or intervane space 112. Line 24 represents the downwards projection of the tangent to the extreme right portion of the inner face 25 of casing 13.

The distance from tangent 24 to the intersection of bordering face 23 and inner face 25 is shown at 26. The distance from tangent 24 to the intersection of bordering 22 and inner face 25 is indicated at 27. Similar bordering faces 122 and 123 extend downwardly and border the respective working chamber or intervane space 212. The distance from the tangent 24 to the intersection or bordering face 122 and inner face 25 is indicated at 28. The distance from tangent 24 to the intersection of bordering face 123 and the inner face 25 is indicated at 30.

The plane face which goes through the center line of the rotor and through the center line of the cylindrical inner face 25, wherein the eccentricity is provided, is called hereafter the eccenter face 31 and the distance between the projection face 24 and the eccenter face 31 is indicated at 29.

The angle between the respective bordering face 23 and the eccenter face 31 is hereafter called the rotary angle "alpha." All later equations and calculations are based on this rotary angle "alpha." Each working chamber or intervane space for example 112, 212, 312, 412, 512 and the like has its own rotary angle "alpha" if it rotates over the respective closing arc or closing face of control body 1. If rotary parts in FIGS. 1 to 3 are rotating in clockwise direction, as indicated by the arrow A, and if the fluid machine acts as a pump, than the fluid passage 2 may be a low pressure passage while the fluid passage 3 may be a high pressure passage. Consequently control port 4 may be a low pressure control port while control port 5 may be a high pressure control port.

Therefore, the rotor passages 11 contain fluid under a lesser pressure if they communicate with intervane spaces 412 or 512 as these spaces are expanding and thus drawing in fluid. Conversely, the intervane spaces 212 and 312 will be filled with fluid under increasing pressure because these spaces are decreasing in volume and force fluid under pressure through control port 5 into fluid passage 3 of control body of pintle 1.

Since intervane space 512 is filled with fluid under less pressure, while intervane space 212 is filled with fluid under high pressure, it will be understood that, from the intervane space 212 the fluid under high pressure acts with great force against the casing 13, or capsule ring or casing element, in upwards direction, and acts against the rotor 10 with great force in downwards direction, while the similar force out from the intervane space 512 is smaller.

These actions of fluid under pressure in upwards and downwards direction outwardly from intervane spaces 512 and 212 are not of the same magnitude throughout one rotation of the rotor.

If, for example, the bordering face 22 is in the location 22 of FIG. 3 than the intervane space 112 would be located upwards of the center part of the fluid machine of FIGS. 2 or 3.

If, on the contrary, the bordering face 22 coincides with the eccenter face 31, then the intervane space 112 would be located only to the right of the center part of the fluid machine of FIGS. 1, 2, and 3.

Thus, if the respective vane or bordering face travels from position 22 to position 23, then the size of the area which is under high pressure decreases during this travel from position 22 to position 23. Thereafter th enext intervane space 512 will be connected with the control part 5 and therefore, thereafter again the fluid under pressure will act in the area to the right of the bordering face 22 and will thereafter gradually decrease until the vane or bordering face reaches the position 23. This means that, during the travel of one vane or of one intervane space over the closing arc 6 of control body 1 from the low pressure control port 4 to the high pressure control port 5, the force of fluid which acts upwards against casing 13 or its inner face 12 and downwards against the rotor 10 changes suddenly from a small amount to a big amount. The force is at maximum if fluid under high pressure acts to the right of bordering face 22 and it decreases thereafter gradually until the fluid under high pressure is only to the right of the bordering face 23 where it reaches a minimum during rotation of the rotary parts of the machine. Thereafter the fluid under high pressure again changes suddenly to the right of bordering face 22 when the next intervane space enters into connection or communication with the high pressure zone and, therefore, again a much higher load in radially upwards and downwards direction appears on casing or capsule ring 13 and on the rotor parts 10 etc.

This change of the area and of the size of the projection of the load by fluid under pressure, against the casing or capsule ring 13 and against the rotor 10, will be, in accordance with this invention, hereafter called the "disturbing load."

The disturbing load in upwards direction changes from maximum to minimum as many times, during one revolution of the rotor, as there are intervane spaces, cylinders cells, working cells or vanes or pistons present in the respective fluid machine.

But the hereafter so called "disturbing load" acts not only in upwards direction but similarly also in downwards direction. Therefore, during one revolution of the rotor parts the rotor 10 as well as the capsule ring or casing 13 will be pushed by the so called "disturbing load" as many times upwards and as many times downwards as there are intervane spaces or vanes respectively other working chambers, or working means, present in the respective rotary fluid machine.

In the cases of high pressure in fluid machines of several hundred atmospheres, the "Disturbing Load," may reach very large magnitudes, for instance thousands or many thousands of kilopoints or many tons and the change from heavy load to lighter load and the change from upwards direction into downwards direction on the respective rotary parts like rotor 10, or on the casing or capsule ring 13, may happen suddenly within very small fractions of seconds and will therefore result in vibrations or in noise in the rotary fluid machine.

In order to prevent the "disturbing load" or to reduce the "disturbing load" it is suitable in accordance with this invention to calculate the disturbing load.

For this purpose the distance from the eccenter face 31 to the intersections of the respective bordering faces 22 or 23 and the inner face 25, will be called the distance "$a$."

The distance "$a$" depends on the eccentricity "$e$" of the axis of the capsule ring or casing 13 and of inner face 25 relative to the axis of the rotor 10, on the size of the inner radius "$R$" of the capsule ring or casing 13 or on the diameter of the inner face 25 and on the rotary angle "alpha." The size "$a$" can be calculated by Equation 1 as follows:

$$a = e \cos \alpha + R - \frac{e^2}{2R} \sin^2 \alpha \quad (1)$$

The distance between the tangent 24 and the point where the upwardly directed "positive disturbing load" has its smallest size, which is at the intersection of bordering face 23 and casing inner face 25, is indicated by LDL 26. The greatest magnitude of this distance is indicated by the intersection of bordering face 22 with inner face 25, and is indicated at LDL 27. The disturbing load therefore changes, during travel or an intervane space over the closing arc 6 of the control body, from the length LDL 27 to the length LDL 26. The length during which the "positive disturbing load" acts, as indicated by LDL, can be calculated as follows:

$$LD_L = [R - a \sin \alpha] = \left[ R - \left( e \cos \alpha + R - \frac{e^2}{2R} \sin^2 \alpha \right) \sin \alpha \right] \quad (2)$$

Since thereby the length LDL through the projection of the area of the acting positive disturbing load PDL is known, it is also possible to calculate the positive disturbing load PDL by multiplying Equation 2 with the axial length "$B$" of casing capsule ring 13 (see FIG. 1) and by multiplying by the specific pressure. The disturbing load PDL can therefore be calculated by Equation 3 as follows:

$$PD_L = [R - a \sin \alpha] B \cdot P = \left[ R - \left( e \cos \alpha + R - \frac{e^2}{2R} \sin^2 \alpha \right) \sin \alpha \right] B \cdot P \quad (3)$$

Figure 4:
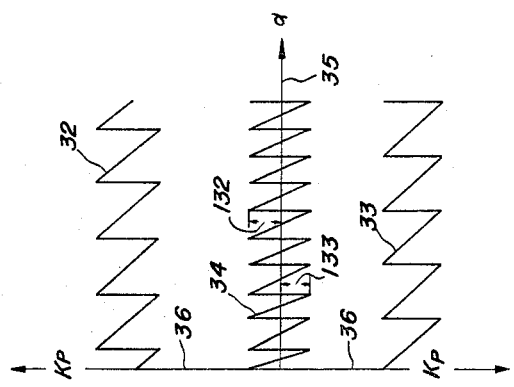
FIGURE 4 shows a diagram explaining the disturbing load of conventional rotary machines without noise damping means.

The so calculated "positive" upwards directed disturbing load is shown in FIG. 4 by curve 32, and it will be seen that the said load changes very suddenly between a maximum and a minimum.

In the equations:

$R$—is the radius of the inner face 25 of the casing capsule ring 13

$e$—is the eccentricity between the axis of rotor 10 and casing or capsule ring 13

$B$—is the axial length of the casing capsule ring 13

$P$—is the specific pressure in the fluid for instance p.s.i. or kp./cm.$^2$ $a$—is the size which was defined above $\alpha$—is the rotary angle between the respective vanes center line and the eccenter face 31 through the inner and outer dead points, if the respective vane is of negligible thickness.

At the same time, but at different angles "alpha," a downwards directed "negative disturbing load" acts also against the casing or capsule ring 13, and is delineated by curve 33. The summation of both the "positive" and the "negative" disturbing load is shown by curve 34. The "O" line between the upwards and downwards directed load is shown by abscissa 35. The upwards directed load is shown by the positive ordinate 36, while the downwards directed load is shown by the negative ordinate 36.

It will be apparent from the diagram of FIG. 4 that the disturbing load on the casing capsule ring 13, which is the sum of the upwards and the downwards directed, positive and negative, load shown by curve 34 changes suddenly from a large negative value 133 to a large positive value 132 and vice versa during operation of the machine.

The changing disturbing load imparts to the casing or capsule ring 13 sudden upwards and downwards vibrations in the clearances of its bearings etc. and also might cause deformations. This causes the noise. At the same time, a disturbing load acts on the rotor 10 in a direction opposed to the disturbing load on the casing or capsule ring 13. This also results in noise and vibrations of the rotor.

Thus, during each rotation, all rotary parts are subjected to the strong forces of the disturbing load for upwards and downwards impulsive sudden movements. These sudden changes of the disturbing load caused the vibrations and noise in rotary fluid machines, and it is prevented or substantially reduced in accordance with this invention.

For this purpose the closing arcs or closing faces 6 and/or 7 of control body 1 are enlarged in a peripheral direction, so that the "closing arcs" or closing faces 6 and 7, or one of them, is wider in a peripheral direction than the peripheral extent 17 of the rotor or rotor bush passages 11.

Thereby the respective intervane space 12 will be closed by the closing arc 6 or 7 of control body 1 during the time the respective working chamber, for instance intervane space 112, travels over the closing arc 6 of the control face of control body 1.

If during such a closed travel of a respective working chamber, for instance, intervane space 112, the location of the invervane space is to the right of the eccenter face 31 of the figures, then during clockwise travel the intervane space 112 decreases its volume to a certain extent while traveling over the closing arc 6 of the control face of control body 1.

Thus, in the closed, and volume decreasing, intervane space, for instance 112, there occurs a compression of the fluid which is present in the respective intervane space 112 and/or rotor passage 11 and/or rotor bush passage 11.

This compression, which takes place in the fluid in the closed, and volume decreasing, intervane space or working chamber 12, for instance 112, can be calculated by Equation (4). Equation (4) will then read as follows:

$$\Delta p = \int dp = -\frac{1}{\beta v}\int \frac{dv}{V} = -\frac{1}{\beta v} ln = \approx -\frac{1}{\beta v}\frac{(V_2-V_1)}{V_1} \quad (4)$$

In Equation 4:

$\beta v$=the compression coefficient of the fluid which is contained in the closed chamber of intervane space $V$=the volume of the working chamber, like the intervane space and rotor or rotor bush passage; or in other words the volume of the chamber which is closed during rotation over the closing arc of the control face of the control pintle.

The more the closing arc or closing face 6 of control body 1 is enlarged peripherally in a clockwise direction, that means the larger the pressure increase providing closing arc 6 of the control face of control pintle is dimensioned, the greater will be the compression of the fluid in the respective closed intervane space 12. The pressure increase results when closing arc 6 closes the intervane space when it has substantially its largest volume. The pressure decrease occurs when closing arc 7, which is diametrically opposite the closing arc 6, closes an intervane space when it has substantially its smallest volume.

It is accordingly desirable that closing arc 6 be so dimensioned, located, or extended that, at the end of the closing time of a working chamber, the pressure of the fluid in the working chamber is substantially equal to the pressure inside the high pressure control port 5, so that there is substantially pressure equalization during opening of the working chamber to the passage 11 or the port 5.

Therefore, during rotation over the closing arc 6 of the control face of control pintle 1 the pressure increases relatively gradually from the low pressure of control port 4 until it reaches the high pressure of control port 5.

The sudden change of the pressure in the respective intervane space 12 from low pressure to high pressure is therefore partially prevented by this embodiment of this invention by the enlarging of the closing arc 6 of the control pintle 1.

The greater is the difference between the low pressure in control port 4 and the higher pressure in the high pressure control port 5 is, the more the peripheral extent of closing arc 6 of the control face of control pintle 1 should be increased.

At the same time as the intervane space 112 is closed by the closing arc 6, intervane space 312 will be subjected to the high pressure fluid at the control port 5.

But during further rotation in clockwise direction, if the intervane space is leftwards of the center line or eccentric face 31 the volume of the closed intervane space 312 increases and thereby the pressure in the fluid in the closed chamber 312—11 decreases when it travels over the pressure decrease providing closing arc 7. Such decrease may occur substantially and gradually during further rotation in clockwise direction, until it reaches the low pressure of the low pressure control port 4 and until the said intervane space 312 communicates with the rotor passage 11 or through the rotor bush passage 11 with the low pressure control port 4.

If, on the contrary, the fluid machine acts as a fluid pump and rotates anti-clockwise, than the closing arcs should be enlarged anti-clockwise.

If on the contrary the fluid machine acts as a hydraulic motor or as a fluid motor and if the control port 4 is the high pressure port through which the fluid under pressure will be supplied and if the eccentricity is an shown in FIGS. 2 and 3 and the rotary parts rotate in clockwise direction, then it is more suitable to enlarge the closing arcs anti-clockwise.

Then, during the rotation of the intervane space 112 over the closing arc 6 of the control face, the intervane space 112 will gradually still increase its volume and thereby the pressure will gradually decrease in the respective intervane space until communication with the then low pressure control port 5 is established. The pressure increase providing closing arc 6 acts then as a pressure decrease providing closing arc.

The intervane space 312 would decrease its volume during rotation over the closing arc 7 and thereby gradually increase the pressure in the closed chamber until the pressure therein is substantially equal to the high pressure which is acting in the then high pressure control port 4. The pressure decrease providing closing arc 7 acts then as a pressure increase providing closing arc.

The eccentricity of the fluid machine could be reversed and the reduction of the disturbing load by the gradual increase and decrease of pressure in the closed working chamber in accordance with the invention will still be possible.

Due to the gradual decrease and increase of the pressure during the travel of the respective intervane space over the closing arcs 6 and 7 of control pintle 1, the sudden disturbing load 34 of FIG. 4 will be decreased and will be very much reduced. The thereafter softened disturbing load is substantially between the curve 34 of FIG. 4 and curve 39 of FIG. 5. The softened positive disturbing load is between curve 32 of FIG. 4 and the curve 37 of FIG. 5 and the softened negative disturbing load is between curve 32 of FIG. 4 and curve 38 in FIG. 5.

However, it is an objective of this invention to reduce the disturbing load until it reaches the curves 37, 38, and 39 of the figures or is even further reduced.

This is achieved according to the main object of this invention by the fact that the closing arc 6 or 6 and 7 of the control face of control pintle 1 is substantially still further increased in peripheral direction and that, additionally, in accordance with this embodiment of the invention, a noise damping piston 40 or noise damping differential pistons 41 are provided in fluid operating or fluid operated rotary machines.

Figure 6:
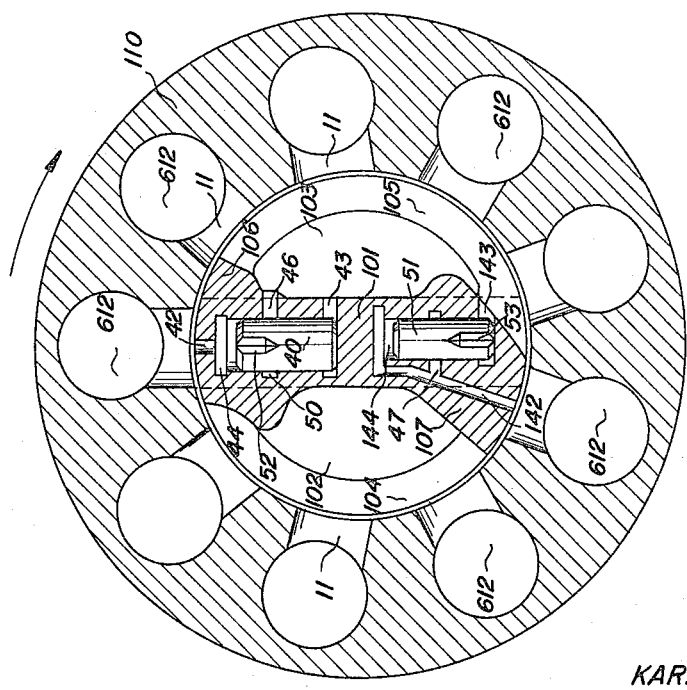
FIGURE 6 is a cross sectional view through a control body and a rotor of a rotary fluid machine of the axial piston type wherein embodiments of the noise damping piston means of this invention are assembled in the control body.

The action of the noise damping piston 40 of this invention will be understandable from FIG. 6.

If the respective cylinder space 612 compresses during the time when the respective working space, for instance 612, is closed by the closing arc 106 of the control face of control pintle 1 then the compression appears in the closed space 612 and this compression becomes effective, through a respective fluid passage 42, in the noise damping cylinder 44.

Under this pressure the noise damping piston 40 moves inwards into the control pintle 1 or away from the respective compressing space 612. Due to this fact the disturbing load will not be so sharp and abrupt, but will be more slowly and more softly, and this will result in the prevention or reduction of vibration or noise.

Noise damping piston 40 is, in the embodiment of FIG. 6, located formed in a respective noise damping cylinder 44 inside control body 1. The noise damping pistons 40 are very effective if they are located in the control body 1 close to the respective closed working chamber or working space 612. However it is also possible to provide the noise damping pistons of this invention in other parts of the fluid machine.

The fluid passage 43 is also provided and extends from the other end of the noise damping cylinder 44 into the high pressure control part 105 or into the high pressure passage 103.

According to the embodiment of FIG. 6 another noise damping piston 140 is located, in the neighbourhood of closing arc 107, in a respective noise damping cylinder 144 in control body 1. The fluid passage 143 extends from cylinder 144 into the neighbouring control port 105 or fluid passage 103. The fluid passage 142 extends from the other end of noise damping cylinder 144 through the closing arc 107. If the pressure in the control port 105 is higher than in the closed working space 612, then piston 140 moves away from the part of cylinder 144 adjacent control port 105 and towards the passage 142, and thereby toward the closed working chamber 612. If on the contrary the pressure in the closed working chamber 612 is higher than in control port 105 the noise damping piston 140 moves in the reverse direction.

These movements of control piston 140 reduces substantially the disturbing load and spreads the compression or expansion in the closed working chamber 612 over a longer time of the rotary movement of rotor 110.

It is also possible to provide unloading chambers 50 or 51 around the control piston 40 or 140, and to connect the unloading chambers by respective fluid passages 46 or 47 respective control ports or fluid passages.

Notches or bores or passages or other passage means 52 or 53 may also be provided in or on the noise damping control pistons 40 or 140. A limited quantity of fluid may be enabled to pass through the said notches or passage means 52 or 53 of the noise damping pistons 40 or 140 from one end of the respective noise damping cylinder 44 or 144 into the respective unloading chamber 50 or 51 or vice versa. This pasage of fluid will adidtionally reduce or eliminate a part of the disturbing load. It is especially suitable to locate the notches or passage means 52 or 53 in such location in or on the noise damping pistons 40 or 140 that they are timewise or strokewise opened or closed, in order to attain the most effective reduction or preventing of the positive or negative, or summated, disturbing load.

It must be noted that the noise damping pistons 40 or 140 can be effective only if their mass is calculated and if their size and stroke are calculated accurately, so that the noise damping pistons are able to reciprocate under the force of pressure on both of their ends, which pressures change very suddenly and in very small fractions of a second.

Figure 7:
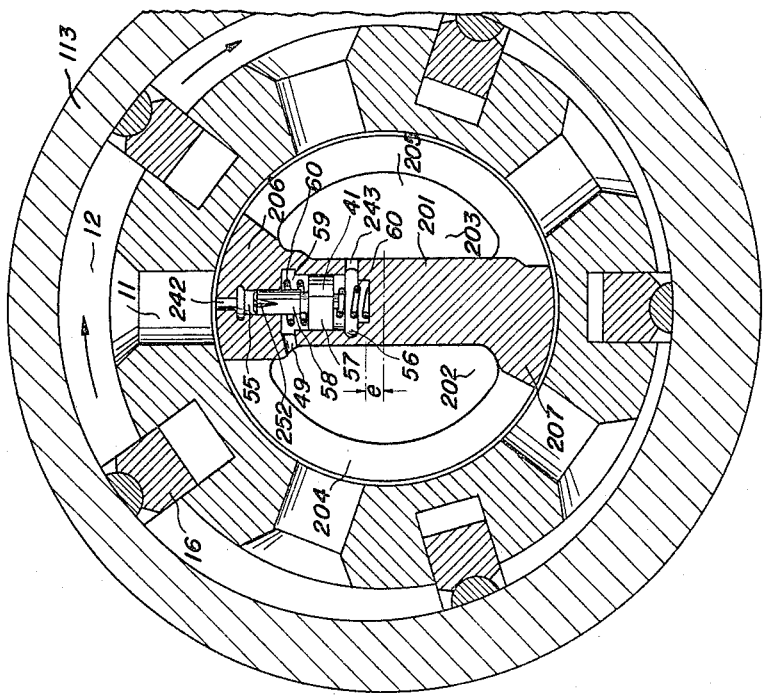
FIGURE 7 is a cross sectional view through a rotor and a control body of a rotary fluid machine of the vane type wherein embodiments of the piston means of this invention are assembled in the control body.

In the fluid machine of FIG. 7 which also has a casing 113, intervane spaces 12, rotor chambers 11, vane assemblies 16, a control pintle 201, pintle passages 202 and 203 and control ports 204 and 205 as well as enlarged closing arc 206 and 207, is demonstrated how the noise damping differential piston 41 of this invention is located and acting. The noise damping differential cylinder 54 is provided in a stationary part of the fluid machine preferably close to the respective closed chamber 12, for instance, in control body 201.

The noise damping differential cylinder 54 consists of the narrowed cylinder part 55 and the wider cylinder part 56.

The damping differential piston 41 consists of a noise narrowed piston end 58 and a wider piston end 57. The narrowed part 58 is inserted and able to reciprocate in the narrowed cylinder part 55, while the wider part 57 is located and able to reciprocate in the wider cylinder part 56.

In the embodiment of FIG. 7 the fluid passage 242 extends from pintle 201 into the closing arc 206 and therethrough, and provides the timewise communication between the narrowed cylinder part 55 and the respective closed working chamber 12. The fluid passage 243 extends from the wider cylinder part 56 into the adjacent control body passage 203 or control port 205 and provides the communication between said cylinder part and said passage and control port. An inter-cylinder space 59 may be provided as a part of the differential cylinder 54 and may surround a part of the noise damping differential piston narrower part 58. A fluid passage 49 may extend from said differential cylinder inter-cylinder space 59 into the fluid passage 202 or control port 204.

Spring means 60 may be provided in the wider cylinder part 56 and/or in the inter-cylinder space 59 and/or in the narrowed cylinder part 55. Notches or passage means 252 may be provided on the wider piston part 57 or on the narrowed piston part 58. Thus, the noise damping differential piston 41 will be able to reciprocate in the respective noise damping differential cylinder 54 under the forces of fluid on its ends and/or under the forces of springs on some or parts of its ends and/or may allow limited leakage to pass through the timewise opened and timewise closed notches or passage means 252 and thereby effectively reduce or soften the disturbing load if the said means of this invention are properly dimensioned and located.

In the embodiment of FIG. 8 casing 313 is preferably a rotary casing and the pistons 16 reciprocate in the cylinder spaces 712. The cylinders and pistons are provided in rotor 310 as known in the art, and the cylinder spaces 712 increase and decrease their volumes during revolution of rotor 310. Control body 301 is also provided in the embodiment of the machine and has closing arcs 306 and 307. The control pintle has fluid passages 302 and 303 and control ports 304 and 305.

Fluid passage 342 is similarly located and acts similar as fluid passage 242 in FIG. 7. The narrowed cylinder part 355, the inter-cylinder space 359 and the wider cylinder part 356 are similar as the respective parts 55, 59, and 56 of FIG. 7. The wider piston part 357 is similar to the wider piston part 57 of FIG. 7, the narrowed piston end 358 is similar to part 58 of FIG. 7 and the notch or passage means 352 is similar to part 252 of FIG. 7. Also similar are the spring means 360 and 60 of FIGS. 7 and 8. The fluid passage 343 of FIG. 8 is similar to and acts similar to the fluid passage 243.

However, the feature of FIG. 8 is that the fluid passage 349 extends from the differential cylinder inter-cylinder space 359 into the fluid passage or control port 305 whereby a different power play of the forces of fluid under pressure on faces or partial end faces of the noise damping differential piston 341 can be modified.

In FIG. 9 it is demonstrated that a rotary fluid machine having intervane spaces could similarly be supplied with differential noise damping pistons 341 of FIG. 8 and also with the additional means of FIG. 8.

FIG. 10 represents again a rotary machine of the vane type having a casing 413, vane assemblies 416, rotor passages 411, a control body 401 with closing arcs 406 and 407, fluid passages 402 and 403 and control ports 404 and 405 or control body 401. A differential cylinder and a noise damping differential piston therein are located in control body 401 and characterized by the wider cylinder part 456, by the narrowed cylinder part 455, by the narrowed piston end 458, by the wider piston end 457, and by the inter-cylinder space 459. Fluid passage 452 connects the wider cylinder space 456 with the inter-cylinder space 459 and extends through the control body 401 and its closing arc 407 in order to provide communication between the respective closing working chamber 12 and the wider cylinder space 456 and the inter-cylinder space 459. The fluid passage 443 extends from the narrowed cylinder space 455 into the fluid passage 402 or control port 405. Spring means 60 and notches or passage means 452 may also be provided, but can also be omitted.

By the embodiment of the noise damping differential cylinder and noise damping differential piston and of the respective fluid passages shown in FIG. 10, another modification of the size and forces of fluid under pressure on the ends of the noise damping differential pistons can be obtained.

In FIG. 11 is again an embodiment of the rotary fluid machine, having intervane spaces such as in FIG. 10 and the noise damping piston means and its adjacent parts are assembled or provided in the control body 501 of the figure in the same way as they were done according to FIG. 10. In the other part of the control body 501 are the noise damping differential piston 341 and its adjacent part provided so as it is done in the embodiment of FIG. 9. By this combination of a plurality of noise damping differential pistons as demonstrated in FIG. 11, it is shown how a very effective reduction of the disturbing load can be achieved.

In the embodiment of FIGS. 12, 13, 14 and 15, additional features and embodiments of this invention are illustrated. One of the features is that the noise damping differential pistons 656 and 1656 cooperate with control cylinder 663 and with control piston 664. Another of the features is that the wider parts 657 and 1657 of the noise damping differential pistons are inwardly directed so that the innermost cylinder space 655 is a wider part of a noise damping differential cylinder. Still another feature is that the noise damping piston means of this invention can be combined with a device 680 for damping fluctuations, such as shown in my copending patent application Serial No. 54,111.

In the said patent application, means for damping the fluctuations are disclosed. The fluctuations appear in the flow of fluid out of the working chambers and these fluctuations in fluid flow also result in noise or vibrations in the machine. The said noise and vibrations are reduced by the means of the said invention.

However, it should be noted that the fluctuations in the fluid are not created by the disturbing load, which is described in the present invention, but depend on rotor kinematical effects.

If the noise damping means of this invention are combined with the means for damping fluctuations of my patent application Serial No. 54,111 then the fluid machine can be made very silent and smooth in operation.

The fluid machine demonstrated in FIGS. 12 through 15 includes a rotor 610 wherein the rotor passages 611 lead to the working chambers in the rotor. The working chambers are not shown in said figures because they are known or already shown in other figures. Rotor bush 1610 may be provided in rotor 610 and rotate therewith. Control body 601 is located inside of the rotor bore or rotor hub 619 and is provided with entrance or exit fluid passages 602 or 603 and with the control ports 604 and 605. Inside of control body 601 is a bore 681 provided and inside of the bore 681, which extends from fluid passage 602 into fluid passage 603, is the device 680 for damping fluctuations, as disclosed in my copending patent application 54,111.

From control port 605 or fluid passage 603, then extends the fluid passage 647 leading into the one end of the control cylinders 663 and the fluid passage 746 extends from control port 604 or fluid passage 602 into the other end of the control cylinder 663. The control cylinder 664 of this embodiment of the invention is located in the control cylinder 663 and is able to reciprocate therein or move therein from one end to the other. The fluid passage 648 extends substantially from the medial or center part of the control cylinder 663 into control body 1 and into the noise damping differential cylinders of this invention. Thus, if control cylinder 644 is moved to one end in control cylinder 663 then fluid can pass from fluid passage 602 or control part 604 through fluid passage 648 and therefrom into the respective noise damping differential cylinders of this invention. If control piston 664 is moved into the other end of control cylinder 663 then fluid can pass from fluid passage 603 or control port 605 through fluid passage 647 and through control cylinder 663 and through fluid passage 648 into the noise damping differential cylinder of this invention.

The noise damping differential cylinder of this embodiment of the invention has narrow cylinder parts which are directed outwardly and which are connected through the respective fluid passages 642 or 643 into the respective closing arcs 606 or 607 of control body 1, and thereby timewise communicated with the respective rotor passages 611 of the respective closed or closing or opening working chambers.

The wider piston ends 657 or 1657 are located in the wider cylinder parts 656 or 1656. The narrower piston ends 658 or 1658 are provided in the narrower cylinder parts 655 or 1655, and between the narrowed piston ends 658 or 1658 and the wider piston ends 657 or 1657 the inter-cylinder spaces 659 or 1659 are provided. In the embodiment of the invention, the fluid passage 648 extends from control cylinder 633 into both inter-cylinder spaces 659 or 1659. Spring means 60 may also be provided in the inter-cylinder space but they may also be omitted according to the situation. From the innermost cylinder space 655 there extends the fluid passage 2648 leading through control body 1 and/or through closure member 666 into the rotor hub 619 or into a space of a fluid machine under less or no pressure or into other spaces. From the outwardly directed narrowed cylinder part 655 or 1655 there extend the fluid passages 642 respectively 643 through the respective closing arc 606 or 607 for timewise communication with the respective closed working chambers. Notches or passage means 652 may also be provided in the respective noise damping differential pistons.

Thus, depending thereon in which parts of the noise damping cylinder spaces the higher pressure is acting or the higher force is acting against the ends or parts or end faces of the respective noise damping differential piston, the said noise damping differential pistons move outwardly or inwardly following the play of the forces acting on its ends or parts. The notches or passage means 652 may thereby be partly opened or closed and allow passage of interruption of the flow of a certain quantity of fluid therethrough.

By the above described action the disturbing load can be substantially reduced or eliminated if the respective noise damping differential pistons, and the fluid passages, as well as the differential cylinders, are suitably dimensioned and suitably located.

It should be understood that the noise damping pistons and neighbouring parts are in rotary machines of high rotary velocity, are of small mass only and are in practice larger or smaller than shown in the figures. In certain practical applications, the noise damping pistons or differential pistons are made of aluminum, are very small sized, or may also be made of a synthetic material, bakelite, or the like or they may also be of steel and they may weigh only several grams.

The embodiment of FIGS. 16, 17 and 18 illustrates that the noise damping pistons of this invention need not necessarily be provided in a cylindrical control body, but that they also can be provided in control bodies which are located axially of a respective rotor and that they may also be located in a stationary casing.

In the embodiment of FIGS. 16 to 18 the noise damping pistons 740 and 1740 are located in the floating control disc or control body 701, and the control cylinder 763 with its control piston 764 is located in the casing 713.

It is also possible to provide said cylinders and pistons in the reverse arrangement, so that noise damping cylinders and pistons are provided in the casing 713 but the control cylinders and control pistons 763 and 764 are provided in floating control disc 701. It is also possible to provide the noise damping cylinders and pistons and the control cylinder and pistons in the floating control disc or control body 701 or to provide them or a part of them in the control pintle adjustment body depending on the actual design or design requirements.

Rotor 710 revolves in casing 713 if the machine operates and the pistons 716 are moving inwards and outwards in cylinders 712 of rotor 710. The rotor passages 711 extend from the respective cylinder or working chamber 712 through rotor 710 into the control face 82 of rotor 710. Control face 82 is in this case a plane face but could also be a conical or spherical control face. The control body 701 or the floating control body disc 772 is engaged axially against rotor 710 and is prevented from rotation by the pin means 778 which are extending into the slot means or axial guide means 779 in casing 713. The control body or floating control disc 701–772 is provided with control ports 702 and 703 which extend axially therethrough. Backwards of the floating control body disc 772 of control body 701 there is the control member adjustment body 773 engaged with the floating control disc 772. The floating control disc 772 and the control pintle adjustment body 773 are provided with spherical faces and bear against each other by said spherical faces which are so formed that they are able to cooperate together and that one is complimentary to the other.

The outer end of the control pintle adjustment body 773 has a plane face which can slide radially on a respective plane face of casing 713. The control pintle adjustment body 773 is prevented from rotation by the pin means 1778 which extend into respective bores, recesses, or slots of casing 713 and of the control pintle adjusting body. The control pintle adjustment body 773 is also provided with fluid passages 1702 and 1703 which extend therethrough and which provide the communications between the control ports 704 and 705 of control disc 772 and the fluid passages 702 and 703 of casing 713.

Therefore the fluid can flow from entrance or exit port 708 through fluid passages 702 and 1702 and through the control port 704 and through the respective rotor passages 711 into the respective working chamber 712 and out thereof through respective rotor passages 711 and through control port 705 and thereafter through fluid passages 1703 and 703 through entrance or exit port 709 out of the machine, or vice versa.

Fluid passage 746 connects one end of control cylinder 763 with fluid passage 702, and fluid passage 747 connects the other end of control cylinder 763 with fluid passage 703 while fluid passage 748 connects the innermost cylinder space 755 of the noise damping cylinder with the center part of the control cylinder 763.

Fluid passage 743 connects one end of the noise damping cylinder through the respective closing face of control disc 772 timewise with the respective rotor passage 711 and thereby with the respective closed working chamber, while fluid passage 747 connects the other end of the noise damping cylinder with the other closing face or closing arc of control disc 772 and thereby with the respective rotor passage 711 and the respective closing working chamber 712.

The fluid passages 1742 and/or 1743 may be provided or may be omitted, and if they are provided as shown in FIG. 17 then they may form or constitute the respective space or ring groove or spaces or ring grooves around the respective noise damping pistons 740 or 1740 or around a part of the surface or surfaces of said noise damping pistons so that they communicate strokewise or timewise with the respective notches or passage means 752 or 753 of the noise damping piston 740 or 1740.

Thus, the control piston 764 and/or the noise damping pistons 740 and/or 1740 may reciprocate or oscillate or move inwards and outwards in the respective cylinders depending on the fluid pressures which are acting in their respective ends. If the notches or passage means 752 and/or 753 are provided, then a limited quantity of fluid may pass therethrough depending on the timewise location or on the stroke of the respective noise damping pistons.

Other parts as well as the noise damping means of the embodiment of FIGS. 16, 17, and 18 act similarly as in other figures, and they reduce or eliminate or soften the disturbing load and thereby the noise or vibrations.

It will be demonstrated hereafter, with reference to FIGS. 19, 20, 21, 22, and 23, that the provision of noise damping differential pistons also results in reducing the disturbing load in simple kinds of control pintles or control bodies.

The embodiment of FIGS. 19 to 23 represent another object of this invention which is a stationary, non-pivoting control pintle 801.

Such kind of control pintle is inserted into the fluid machine at a certain angle "beta" so that, during the rotation of the rotor parts, during a certain time the respective intervane space or working chamber will be closed by the respective closnig arc 806 or 807 of the control pintle 801. The closing of the respective working chamber or intervane space will be done by the closing arc or arcs 806 and/or 807 or by other closing arcs or closing faces of the control surface of control pintle 801.

The control body of this embodiment is also provided with fluid passages 802 or 803 for the passage of fluid into and/or out of the respective rotor of the fluid machine. Control ports 804 and 805 are also provided. The uninterrupted closing arc of the control surface of the enclosing arc or arcs 806 and 807 of the control face will be located between the control ports 804 and 805 of the control body 801.

As an object of this embodiment of the invention the control body 801 is provided with at least one, or preferably, with two, longitudinal extending grooves or bearing grooves 61 and 161.

The longitudinal extending grooves 61 and/or 161 extend through the respective uninterrupted or closing arc 806 or 807 of the control surface 62 of control body 801. From the said longitudinal extending grooves 61 and 161 the fluid passages or communication means 842 and/or 942 extend through the control body 801 into the respective wider or outermost cylinder parts 856 or 956 of the noise damping cylinders.

On the other hand the fluid passage or communication means 848 extends from fluid passage 802 through a part of the control body 801 into one end of the control cylinder 63, while the fluid passage or communication means 849 extends from fluid passage 803 into the other end of the control cylinder 63.

The communication means or fluid passage 847 extends substantially from the middle of the control cylinder 863 into the innermost or narrower cylinder part or space 855 of the noise damping cylinder means of this embodiment of this invention.

The control piston 864 is located inside of the control cylinder 863 and moves, oscillates or reciprocates under the pressure of fluid from one end to the other end inside of the respective control cylinder 864, depending thereon if higher pressure is supplied through communication means 849.

Consequently, the higher pressure of the fluid passages 802 or 803 will always be passed through the communication means or fluid passage 847 into a respective part of the noise damping cylinder means of this invention.

Additionally the fluid passages or communication means 846 and 946 are provided in order to connect the inter-cylinder spaces 849 and/or 949 for instance with the space inside of the fluid machine or with space under less pressure.

Consequently, the higher pressure which is always acting inside of the innermost cylinder part 855 forces both noise damping differential pistons 841 and 941 into radial outwards movement.

If on the other hand, the respective closed working chamber or intervane space of the fluid machine rotates over the respective closing arc 806 or 807 of the control pintle 801, and if the volume of the respective closed intervane space or working chamber decreases thereby, the pressure increases also in the respective longitudinally extending groove 61 or 161 and thereby such increasing pressure, which gradually increases, is effective, through fluid passage or communication means 842, in the outermost cylinder part or space 856 or in the outermost cylinder part or space 956, and thereby acts against the enlarged piston ends 858 or 958 of the noise damping differential pistons 841 or 941.

The disturbing load reduction, or the noise or vibration preventing or reducing action of the noise damping differential pistons 841 and/or 941 is similar to such in the beforehand described similar embodiment of this invention.

Since the inter-cylinder spaces 849 or 949 are in communication with space under less pressure, these inter-cylinder spaces 849 or 949 or the pressure therein will not extensively influence the movement of the noise damping differential pistons 841 or 941.

It is also possible in accordance with this invention to omit the communication means or fluid passages 846 or 946.

It is further possible to use the communication means 846 or 946 to connect the inter-cylinder spaces 849 or 949 with each other. In such cases, the inter-cylinder spaces 849 or 949 may be partially or totally closed. If that is the case, then it would be suitable to provide slot means, notches, recess means triangular grooves, bore means, or other leakage overflow means, overload means or communication means 852 or 853 or 952 or 953 on the respective noise damping piston 841 or 941. Such additional recess or communication means would make possible a certain, but limited, flow of leakage fluid into or out of the respective inter-cylinder spaces 849 and/or 949 at certain locations or at certain movements of the noise damping pistons 841 or 941. The suitable dimensioning and the suitable location of such additional overflow or communication means 852, 853, 952 or 953 on the noise damping piston 841 or 941 or the valves or cylinder means can in the case of suitable dimensioning or location, additionally reduce the disturbing load and thereby decrease the vibration and the noise in the fluid machine.

The relation of the cross sectional area of the enlarged ends 858 or 958 and of the narrowed end 857 or 957 of the noise damping differential pistons will also very much influence the elimination or the reduction of the disturbing load and thereby of vibration and of noise.

It is another object of this embodiment of the invention, that the control body of FIGS. 19 to 23 can be very simply and easily manufactured and will nevertheless be effective in prevention of noise and vibration of the fluid machine.

Additional means for simplifying such a control body 801, and thereby another object of this invention, is to provide a closure member seat 65 from one axial end into the control body 801 and to insert the closure member 66 into the said closure seat. The closure member 66 may be retained or fastened by retaining means or fastening means 67 inside of the control body 801.

Another important object of this invention, is that the noise damping pistons or noise damping differential pistons 841 or 941 as well as the control piston 864 and the respective cylinder may be contained inside of the closure member 66.

This results in a very important simplifying of the control body because the closure member 66 can easily be manufactured separately from the control body 801 and can be made of different and more simplfied material than the control body 801.

In such it is important that the fluid passage or communication means 842 and/or 942 extend through the control body 801 as well as through or into the respective part of the control body closure member 66. Also the communication means or fluid passages 848 or 849 should extend through a part of the control body 801 into or through the respective control body closure member 66.

Another possibility for simplifying the control body is to provide the fluid passages 802 and 803 to extend in one or both axial directions entirely through the control body 801, or on one side into the closure member seat 65.

In such case, it will be suitable and simple to insert the sealing block means 68 from the respective end into the respective part of the control pintle 801 for closing the respective fluid passages 802 or 803 in one axial direction.

For this purpose a sealing means seat 69 may be provided for example in the center part of the control body 801.

The sealing means 68 may then consist of two sealing means fingers 870 and 970. A sealing means neck 71 may be provided between the fingers 870 and 970 and may connect both fingers together.

The neck 71 may be inserted into the sealing means seat 69 of control body 801 and the finger 870 may extend into the axial extending part of fluid passage 803 and may close the same in the said axial direction while the finger 970 may be inserted into the extending part of the fluid passage 802 and close the same in the said axial direction.

The outer end of the sealing block or sealing means 68 may be engaged against one axial end face of the control body closure member 66. Consequently, the seal block means 68 may be fastened between the seal block means seat 69 and the closure member 66 inside of control body 801 and may close the axial extension of the fluid passages 802 and 803 in one axial direction.

The sealing block or sealing means 68 may, instead of being one piece, be divided into two or a plurality of pieces.

The fluid passage or communication means 848 and/or 948 may extend also through the seal means or seal blocks 68, for instance through seal block means fingers 870 and/or 970.

The provision of the longitudinal extending grooves 61 and/or 161 on control body 801 is another feature and object of this invention.

If the control body 801 is immovably fastened in the casing or on a part of the casing cover of the fluid machine and the rotor rotates around the cylindrical part of control body 801 then the longitudinal extending grooves 61 and/or 161 will act as bearing grooves.

This means that the fluid which will be supplied during the closing times of the respective working chambers or intervane spaces will be compressed also inside of the longitudinal extending grooves 61 and/or 161 and will therefore be forced into the clearance between the rotor or rotor bush's inner cylindrical control or face and the peripherial or circumferential outer face or control face 62 of the control body 801.

The fact that the fluid under pressure is forced into the clearance makes it possible that the rotor can rotate around the control body 801 without fastening, sticking, or welding on the surface or control surface 62 of control body 801. More in detail if the rotor assumes an off-center position and rotates about an off-center axis, then strong hydro-dynamic pressure fields would appear in the clearance between the circumferential bearing face 62 of control body 801 and the cylindrical inner face of the rotor hub or rotor center bore.

The bearing face of control body 801 against which the fluid under pressure in the grooves 61 and/or 161 will act is indicated at 62.

In the embodiment of FIG. 24, two noise damping differential pistons 1041 and 1141 are provided. Each of the pistons 1041 or 1141 has one end which extends into the innermost cylinder part 1055 of the noise damping cylinder and is therefore subjected to the high pressure which is effective through the high pressure communication passage 1047. The other axial ends of the noise damping pistons 1041 and 1141 are connected via communication means, for instance via communication recesses or grooves, with the respective adjacent, closed intervane space which is closed during the respective time of rotation over the closing arc of the control surface of control pintle.

The noise damping pistons or noise damping differential pistons 1041 and 1141 are provided in respective noise damping cylinder bushes 1045 and 1055.

The pressure of the fluid in the respective groove or intervane space will be present in the outermost parts 1056 or 1156 of the noise damping cylinders, while the high pressure fluid, as already described, is passed into the innermost cylinder part 1055 of the noise damping cylinder or cylinders. Depending upon which pressure is higher, the high pressure in the innermost cylinder part 1055 or the pressure in the adjacent closed intervane space and thereby the pressure in the outermost cylinder part 1055 or 1056 the respective noise damping piston 1041 and/or 1141 reciprocates or oscilates or moves inwards or outwards in the associated noise damping cylinder or cylinders, thereby dividing the increase or decrease of pressure in the respective closed working chamber or intervane space over a longer period of time and thereby reducing or softening the disturbing load and thereby softening or reducing the vibrations and/or the noise of the rotary fluid machine.

It is suitable to form the noise damping pistons 1041 and 1141 as differential pistons which have a narrowed end 1057 and/or 1157. The narrowed piston ends will extend into the narrower diameter of the innermost cylinder part 1055 while the bigger cylinder parts are present in the outermost cylinder parts 1056 and 1156.

The intercylinder space parts 1049 and 1149 will be formed between the control pintle 1001 and the narrowed piston end part and the enlarged piston and part 1058 or 1158 of the noise damping piston or pistons 1041 and/or 1141 and may be provided with communication means 1046 or 1146 for communication with spaces under less, under high or under no pressure.

The relation of the sections through the narrowed enlarged piston ends of the respective noise damping differential piston 1041 and 1141 decide under what pressure, in the closed intervane spaces, the respective piston 1041 and/or 1141 starts its oscillating or reciprocating movement.

Due to the fact the larger end of the differential piston has a bigger sectional area than the narrow end, the oscillating or reciprocating movement of the noise damping differential pistons 1041 and 1141 can be very much influenced.

If, for instance, the cross sectional area through the enlarged end of a differential piston is two times bigger than the sectional area through the narrowed end, then the outwards movement of the noise damping differential piston needs a two times higher pressure in the innermost cylinder part 1055 over the pressure in the outermost cylinder part 1056 or 1156. If on the contrary the pressure in the outermost cylinder part 1056 or 1156 is in sure case, somewhat greater than the half of the pressure inside of the innermost cylinder part 1055, then the respective noise damping differential piston 1041 or 1141 would already start its inward movement.

Due to this fact, the greater the difference between the cross sectional areas of the outer and inner ends of the noise damping differential pistons, the greater will be differential pressures acting on the pistons. This means that the inward movement of the pistons will start at a lesser pressure, in the closed intervane space, if the difference in the cross sectional areas of the two ends of the piston is increased.

But if the respective noise damping piston starts its inwards movement, then the volume of the enclosed intervane space becomes enlarged, due to the fact that the outermost cylinder space enlarges and the enlargement of the outermost cylinder part volume becomes added to the volume of the enclosed intervane space or working chamber.

This, on the other hand, will substantially reduce the pressure inside of the closed working chamber.

But the reduction of the pressure in the closed working chamber also at the same time reduces the inwards movement of the noise damping differential piston.

The reduction of the inwards movement will, on the other side and during forwards rotation of the intervane space, result in a further compression of the intervane space and thereby in an additional increase of pressure in the intervane space. Consequently the inwards movement of the noise damping differential piston starts again.

Practically, during the rotation of the rotor parts the noise damping piston will gradually and more slowly start its radial inwards movement as a piston without two differential piston ends would start its respective inwards or outwards movement.

Consequently, the provision of the noise damping pistons or of the noise damping differential pistons will have the result that the time during which the respective intervane space or working chamber will be closed can be substantially increased and the increase of pressure in the respective intervane space or working chamber can thereby be substantially spread over a relatively longer time, and thereby the increase of pressure in the respective intervane space or working chamber is affected more slowly. Consequently, the distrubing load will substantially be reduced or eliminated if noise damping pistons are provided for cooperation during the travel of a closed intervane space or working chamber over the respective closing arc or closing face of the control face of the control body.

It should be understood that the noise damping means of this invention can be applied in cylinder piston machines, gear pump machines, trochoid compressed fluid machines or other fluid operation or fluid operated machines as well as to such machines having intervane spaces.

It is possible to form bores, grooves, triangular grooves or the like, or other passage means in the noise damping piston or pistons or in the noise damping differential pistons or piston or in respective noise damping pistons of equal diameter over the whole length thereof. Such bores, grooves, triangular grooves or the like will make possible a certain leakage from one end of the piston to the other end of the piston and will thereby also substantially reduce the sudden disturbing load and would consequently result in a decrease of the disturbing load and thereby in a decrease of vibration and of noise in the fluid machine. But such means must be suitable or suitably dimensioned and located, if they are to be effective.

It was said, heretofore, that the inter-cylinder space 49 or other might be supplied with fluid under less or under no pressure. But instead of being supplied with fluid under less or no pressure they might also be supplied with fluid under high pressure, for instance, like the innermost cylinder part 55 or others. Instead of supplying the high pressure fluid into the innermost cylinder part, it is also possible to supply the high pressure fluid into the intercylinder spaces 49 or others while fluid under less pressure of fluid under no pressure may be supplied into the innermost cylinder part 55 or others. Which supply of fluid under pressure is more suitable, will depend on the design considerations and on the actual rotary machine.

The said bores, grooves, triangular grooves or other communication means on the noise damping pistons or on the noise damping differential pistons makes possible the flow of fluid from the outermost cylinder parts 1056 or others into the innermost cylinder part 1055 or others, from the outermost cylinder part 1156 or others into the innermost cylinder part 1055 or others, or from the outermost cylinder parts 1056 or 1156 or others into the inner or inter-cylinder space 1049 or 1149 or others, or from the innermost cylinder space 1055 or others into the intercylinder space 1049 or 1149 or others, or from the intercylinder space 1049 or 1149 or others into the innermost cylinder space 1055 or others or into the outermost cylinder space 1056 or 1156 or others.

It is also possible to connect the noise damping differential pistons 1041 and 1141 or others together to form a one piece noise damping differential piston.

It would be suitable if leakage means or overload valve means or communication bores, grooves, recesses, triangular grooves or the like on the noise damping pistons or on the noise damping piston cylinders or cylinder walls would not act at all locations of the noise damping pistons but only at certain movements or certain locations during the movement of the noise damping system, for instance, during the movement of the noise damping differential piston 1041 or 1141.

Such specified locations and actions of grooves, communication means, bores or the like may additionally influence the decrease of the disturbing load and thereby might result in decrease of vibrations and in decrease of noise.

Instead of positioning the noise damping pistons in radially extending cylinders it is also possible to locate them in axially extending cylinders.

Furthermore, instead of positioning the noise damping pistons inside of the control body 1 or others it is possible to position them in the casing, in the rotor, in rotary parts, in a floating control disc 72, in a control pintle adjusting body 73, or in a boring disc 74 or the like.

Instead of using cylindrical noise damping pistons means it is possible to use otherwise formed piston means, for instance, plates, valves, bolts, bars, vanes or the like.

In the embodiment of a very effective noise damping differential piston in FIGS. 24, 25, 26, the noise damping differential piston 1041 and 1141 are provided with the noise damper piston passage 75 and/or 76 and with the triangular recess or recesses 77.

The differential noise damping piston or pistons 1041 and/or 1141 are, in this embodiment, located in the damping piston housing or housing 1044 or 1045 and are able to reciprocate therein. The noise damper piston passage 75 extends into the noise damper piston 1041 or 1141 and communicates with the noise damper passage 76. One or a plurality of preferably triangular recesses 77 is provided in the surface of the narrowed piston end or ends 1057 and or 1157 and extend into the respective noise damper piston passage or passages 76.

If the respective noise damper piston 1041 or 1141 is in its outwards position, for instance, as shown in FIG. 25, then the triangular recess or recesses 77 and the noise damper passages 75 and 76 are closed by sealing up the damping piston housing 1044 or 1045 or of the body whereas, when the noise damping pistons 1041 and/or 1141 is in its inwards position for instance as in FIG. 26, and the triangular recess 77 and the outermost cylinder space or spaces 1056 or 1156 communicate with the innermost cylinder space 1055.

Thus, in this position of the respective noise damper piston or pistons 1041 or 1141, the piston or pistons may act as safety or overload valves, letting escape a little quantity of fluid from the respective closed intervane space or working chamber through passages 75 and/or 76 and/or through triangular recess 77 into the innermost cylinder space 1055 or vice versa.

Thus, a flow of fluid may appear through said passage means from the closed working space into the innermost cylinder space 1055 or into the inter-cylinder space 1049 and/or 1149 or vice versa, thereby softening the pressure increasings or decreasings in fluid in spaces and thereby softening or reducing the disturbing load and vibrations or noise in the respective rotary machine.

The said communication on the said passage means will gradually be opened and/or closed during the respective reciprocating movement of the said noise damping piston means 1041 and/or 1141. The noise and/or vibration damping by the said means is therefore very effective.

It should be pointed out that the provision of the noise damping pistons of this embodiment of this invention and especially the provision of the noise damping differential pistons alone would result in a substantial reduction of the disturbing load and thereby in reduction of the vibrations and in reducing the noise of the rotary fluid machine.

But it would be especially convenient and of especially big effect if noise damping pistons or noise damping differential pistons or others would be combined with the pivoting action of the control body as described in my other copending patent application Serial No. 328,395.

Figure 5:
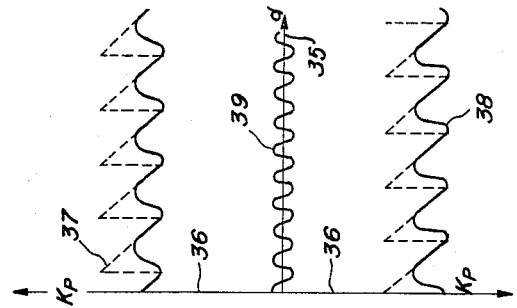
FIGURE 5 is a diagram explaining the narrowed disturbing load which is achieved by the means of this invention.

If the noise damping piston means of this invention are provided in the rotary fluid machines, then the positive disturbing load, the negative disturbing load and the summation of the disturbing loads may so very effectively be reduced or softened, that they are similar to curves 37, 38 and 39 of FIG. 5 or even more softened or prevented.

It appears from FIGS. 4 and 5 that the softened disturbing load is only a fraction of the unsoftened, conventional disturbing load. The means of this invention therefore provide a smooth operation of rotary fluid machines over a long useful life.

This invention shall not be limited to the embodiments shown in the figures, because it is possible to modify or to combine the details thereof without departing from the scope of this invention. It is intended that the patent shall cover all patentable novelty which resides in the invention. The invention shall therefore be limited only by the appended claims.

I claim:

1. A rotary machine having a casing, a rotor means rotatably mounted in said casing and including a plurality of working chambers periodically increasing and decreasing their volume, thereby intaking and expelling fluid, during operation of the machine under power, a substantially stationary control body having a stationary control face for cooperable with a complementary rotary control face on said rotor means, rotor passage means extending from said working chambers through said rotor into and through said complementary rotary control face, at least a pair of spaced control ports formed in said stationary control face, and working chamber closing arc faces located on said stationary control face between said control ports, said closing faces periodically closing at least one rotor passage of said rotor passage means during rotation of said rotor means, fluid passages extending from respective entrance and exit ports through said control body into respective control ports of said control port pair, cylinder means in said machine, piston means reciprocable in said cylinder means, communication-passage means extending from said cylinder means to and through at least one of said closing arc faces, and at least another communication-passage means extending from another part of said cylinder means into a respective space in said rotary machine, the surface of one of said cylinder means and piston means being formed with recess means extending longitudinally thereof for restricted fluid flow longitudinally between said cylinder means and said piston means.

2. The rotary machine of claim 1 wherein said cylinder means and said piston means are located in said substantially stationary control body.

3. The rotary machine of claim 1 wherein recesses are provided in the walls of cylinder means.

4. A rotary machine of claim 1 wherein said longitudinal recess means are control recess means whose cross sectional area varies longitudinally thereof to control the rate of fluid flow through said recess means.

5. A rotary machine of claim 4 wherein said recess means are periodically at least partially opened and closed during the periodic reciprocation of said piston means.

6. A rotary machine having a casing, a rotor means rotatably mounted in said casing and including a plurality of working chambers periodically increasing and decreasing their volume, thereby intaking and expelling fluid, during operation of the machine under power, a substantially stationary control body having a stationary control face cooperable with a complementary rotary control face on said rotor means, rotor passage means extending from said working chambers through said rotor into and through said complementary rotary control face, at least a pair of spaced control ports formed in said stationary control face, and working chamber closing arc faces are located between said control ports, closing arc faces periodically closing at least one motor passage of said rotor passage means during rotation of said rotor means, fluid passages extending from respective entrance and exit ports through said control body into respective control ports of said control port pair, cylinder means in a part of said machine, piston means reciprocable in said cylinder means, at least one communication-passage means extending from said cylinder means to and through at least one of said closing arc faces or for periodic communication with at least one of said passage means, a second communication-passage means extending from said cylinder means into another space in said machine, and recess means, having a longitudinally varying cross sectional area, formed longitudinally in a surface of one of said cylinder means and said piston means to provide at least partially a variable cross section flow channel between said communication-passage means.

7. The rotary machine of claim 6, wherein said cylinder means, piston means and communication-passage means are provided in said control body.

8. A rotary machine having a casing, a rotor means rotatably mounted in said casing and including a plurality of working chambers periodically increasing and decreasing their volume, thereby intaking and expelling fluid, during operation of the machine under power, substantially stationary control body having a stationary control face cooperable with a complementary rotary control face on said rotor means, rotor passage means extending from said working chambers through said rotor into and through said complementary rotory control face, at least a pair of spaced control ports provided in said stationary control face, and working chamber closing arc faces on said stationary control face located between said control ports, said closing arc faces periodically closing at least one rotor passage of said rotor passage means during rotation of said rotor means, fluid passages extending from respective entrance and exit ports through said control body into respective control ports of said control port pair, differential cylinder means in a part of said machine, said differential cylinder means having a wider cylinder part and a narrower cylinder part, differential piston means reciprocable in said differential cylinder means and having a wider piston end and a narrower piston end, said wider piston end extending into said wider cylinder part, said narrower piston end extending into said narrower cylinder part, communication-passage means extending from said cylinder means to and through at least one of said closing faces or into a space in said machine which contains fluid, and a second communication-passage means extending through one of said closing faces, said communication-passage means periodically communicating at least partially with each other when said differential piston means reciprocates.

9. A rotary machine having a casing, a rotor means rotatably mounted in said casing and including a plurality of working chambers periodically increasing and decreasing their volume, thereby intaking and expelling fluid, during operation of the machine under power, a substantially stationary control body having a stationary control face for cooperation with a complementary rotary control face on said rotor means, rotor passage means extending from said working chambers through said rotor into and through said complementary rotary control face, at least a pair of spaced control ports formed in said stationary control face, and working chamber closing arc-faces located on said control face between said control ports, said closing faces periodically closing at least one rotor passage of said rotor passage means during rotation of said rotor means, fluid passages extending from respective entrance and exit ports through said control body into respective control ports of said control port pair, differential cylinder means are provided in a part of said machine, said differential cylinder means having a wider cylinder part and a narrower cylinder part, differential piston means reciprocable in said differential cylinder means and having a wider piston end and a narrower piston end, said wider piston end extending into said wider cylinder part, said narrower piston end extending into said narrower cylinder part, an inter-cylinder part, surrounding said narrower piston end forming an end inter-cylinder space in said wider cylinder part, and communication-passage means extending from said inter-cylinder space into another space in the machine.

10. A rotary machine having a casing, a rotor means rotatably mounted in said casing and includes a plurality of working chambers periodically increasing and decreasing their volume, thereby intaking and expelling fluid, during operation of the machine under power, a substantially stationary control body having a stationary control face for cooperation with a complementary rotary control face on said rotor means, rotor passage means extending from said working chambers through said rotor into and through said complementary rotary control face, at least a pair of spaced control ports formed in said stationary control face, and work chamber closing arc faces located on said stationary control face between said control ports, said closing faces periodically closing at least one rotor passage of said rotor passage means during rotation of said rotor means, fluid passages extending from respective entrance and exit ports through said control body into respective control ports of said control port pair, a flow direction control cylinder means in said machine, a flow control piston means reciprocable in said flow control cylinder means, differential cylinder means in a part of said machine, said differential cylinder means having a wider cylinder part end and a narrower cylinder part, differential piston means reciprocable in said differential cylinder means, said differential piston means having a wider piston end and a narrower piston end, said wider piston end extending into said wider cylinder part, said narrower piston end extending into said narrower cylinder part, an inter-cylinder space formed in said wider cylinder part, surrounding said narrower piston end, a passage means extending from one of said fluid passages of said control body into one end of said control cylinder means, a second passage means extending from the other fluid passage of said control body into the other end of said control cylinder means, a third passage means extending from the middle of said flow control cylinder means into at least one part of said differential cylinder means, a passage-communication means extending from another part of said differential cylinder means into and through at least one of said closing faces, and a recess means extending through at least a portion of at least one of said piston means.

11. A rotary machine having a casing, a rotor means rotatably mounted in said casing and including a plurality of working chambers periodically increasing and decreasing their volume, thereby intaking and expelling fluid, during operation of the machine under power, a substantially stationary control body having a stationary control face for cooperation with a complementary rotary control face on said rotor means, rotor passage means extending from said working chambers through said rotor into and through said complementary rotary control face, at least a pair of spaced control ports provided in said stationary control face, and work chamber closing arc faces located on said stationary control face between said control ports, said closing faces periodically closing at least one rotor passage of said rotor passage means during rotation of said rotor means, fluid passages extending from respective entrance and exit ports through said control body into respective control ports of said control port pair, a flow control cylinder means in said machine, a flow direction control piston means reciprocable in said flow control cylinder means, differential cylinder means in a part of said machine, said differential cylinder means having a wider cylinder part end and a narrower cylinder part, differential piston means reciprocable in said differential cylinder means and having a wider piston end and a narrower piston end, said wider piston end extending into said wider cylinder part, said narrower piston end extending into said narrower cylinder part, an inter-cylinder space formed in said wider cylinder part, surrounding said narrower piston end, a passage means extending from one of said fluid passages of said control body into one end of said control cylinder means, a second passage means extending from the middle of said flow control cylinder means into at least one of said narrower cylinder parts of said differential cylinder means, and a communication-passage means extending from at least another of said parts of said differential cylinder means into and through at least one of said closing faces of said control body.

12. The rotary machine of claim 11 wherein passage means extend from said inter-cylinder space into a space under less pressure.

13. The rotary machine of claim 11, wherein said differential piston means is formed with at least one passage means extending partly therethrough from one axial end thereof and opening through said one axial end, and with a second passage means extending radially through a part thereof and opening through a cylindrical surface thereof and communicating with said axially extending passage means.

14. The rotary machine of claim 13, including further recess means extending from the radial recess means along at least a part of the surface of said piston means.

15. The rotary machine of claim 11 wherein passages extend through said differential piston means.

16. A rotary machine of claim 11, including means supplying fluid to both parts of said differential cylinder means and to said intercylinder space.

17. The machine of claim 11, wherein one of said fluid passages communicates with one space in said differential cylinder means, the other of said fluid passages communicates with another space in said differential cylinder means, and the remaining space in said differential cylinder means communicates at least periodically with at least one of said rotor passages.

18. A rotary machine having a casing, a rotor means rotatably mounted in said casing and including a plurality of working chambers periodically increasing and decreasing their volume, thereby intaking and expelling fluid, during operation of the machine under power, a substantially stationary control body having a stationary control face for cooperation with a complementary rotary control face on said rotor means, rotor passage means extending from said working chambers through said rotor into and through said complementary rotary control face, at least a pair of spaced control ports formed in said stationary control face, and work chamber closing arc faces located in said stationary control face between said control ports, and closing faces periodically closing at least one rotor passage of said rotor passage means during rotation of said rotor means, fluid passages extending from respective entrance and exit ports through said control body into respective control ports of said control port pair, said substantially stationary control body being borne in a portion of said casing, said stationary control body having a cylindrical control part, said control face being a cylindrical control face, said control parts and closing arcs being located on said cylindrical control part and said rotor means being borne on and revolving around said stationary control body.

19. The rotary machine of claim 18 wherein said cylindrical control face has at least one longitudinal extending groove extending over substantially the whole axial length thereof.

20. The rotary machine of claim 18 wherein a closure member seat extends from one axial end into said control body, said closure member seat contains an inserted member or closure member and wherein cylinder means, piston means, and communication means are formed in said inserted member.

21. The rotary machine of claim 18 wherein a closure member seat extends at least from an axial end into said control body, at least one flow passage extends through said control body into said closure member seat, sealing means extend from said closure member seat into said passage and closing said passage in at least one axial direction, an inserted member is retained in said closure member seat and said sealing means is retained at least partially on said closure member.

22. A rotary machine having a casing, a rotor means rotatably mounted in said casing and including a plurality of working chambers periodically increasing and decreasing their volume, thereby intaking and expelling fluid, during operation of the machine under power, a substantially stationary control body having a stationary control face cooperable with a complementary rotary control face on said rotor means, rotor passage means extending from said working chambers through said rotor into and through said complementary rotary control face, at least a pair of spaced control ports formed in said stationary control face, and working chamber closing arc-faces located on said stationary control face between said control ports, said closing faces periodically closing at least one rotor passage of said rotor passage means during rotation of said rotor means, fluid passages extending from respective entrance and exit ports through said control body into respective control ports of said control port pair, cylinder means in said machine, piston means reciprocable in said cylinder means, communication-passage means extending from said cylinder means to and through at least one of said closing arc-faces, at least another communication-passage means extending from another part of said cylinder means into a respective space in said rotary machine, a second cylinder means in said machine, a second piston means reciprocable in said second cylinder means, passage means connecting opposite ends of said second cylinder means to respective different ones of said fluid passages, said second cylinder means having an annular enlargement intermediate its ends, and a further passage means connecting said annular enlargement to a fluid-containing space in said machine.

References Cited by the Examiner

UNITED STATES PATENTS

| | | | |
|---|---|---|---|
| 2,075,017 | 3/1937 | Benedek | 103—161 |
| 2,168,658 | 8/1939 | Thomas | 103—162 |
| 2,529,309 | 11/1950 | Purcell | 103—161 |
| 3,157,130 | 11/1964 | Cadiou | 103—162 |

MARTIN P. SCHWADRON, *Primary Examiner.*

SAMUEL LEVINE, *Examiner.*

R. M. VARGO, *Assistant Examiner.*